United States Patent [19]

Naudin

[11] Patent Number: 4,828,083
[45] Date of Patent: May 9, 1989

[54] FRICTION CLUTCH UTILIZING A PROGRESSIVE ENGAGEMENT ACTION

[75] Inventor: Jacky Naudin, Ermont, France
[73] Assignee: Valeo, Paris, France
[21] Appl. No.: 130,789
[22] Filed: Dec. 9, 1987

[30] Foreign Application Priority Data

Dec. 15, 1986 [FR] France .............................. 86 17479

[51] Int. Cl.[4] ........................ F16D 13/71; F16D 13/44
[52] U.S. Cl. .................................. 192/52; 192/70.18; 192/70.21; 192/70.28; 192/109 A
[58] Field of Search .................. 192/52, 70.21, 109 A, 192/109 B, 70.17, 70.18, 70.27, 70.28, 89 B, 30 V

[56] References Cited

U.S. PATENT DOCUMENTS

| | | | |
|---|---|---|---|
| 710,685 | 10/1902 | Harris | 192/52 |
| 870,263 | 11/1907 | Warren | 192/52 |
| 1,009,424 | 11/1911 | Law | 192/52 X |
| 1,136,025 | 4/1915 | Marker | 192/70.21 X |
| 1,911,789 | 5/1933 | Bischof | 192/52 |
| 1,936,029 | 11/1933 | Ruesenberg | 192/52 X |
| 2,072,116 | 3/1937 | Lewis | 192/52 X |
| 2,124,097 | 7/1938 | Wolfram | 192/70.27 X |
| 3,323,624 | 6/1967 | Maurice . | |
| 3,739,896 | 6/1973 | Shono | 192/70.27 |
| 4,095,683 | 6/1978 | Ban | 192/70.18 |
| 4,619,353 | 10/1986 | Maeda | 192/70.18 |
| 4,660,700 | 4/1987 | Maucher et al. | 192/89 B |

FOREIGN PATENT DOCUMENTS

| | | |
|---|---|---|
| 2155123 | 5/1972 | Fed. Rep. of Germany . |
| 2164297 | 8/1972 | Fed. Rep. of Germany . |
| 349279 | 5/1905 | France .............................. 192/70.21 |
| 2560314 | 8/1985 | France . |
| 500050 | 2/1939 | United Kingdom . |

*Primary Examiner*—Rodney H. Bonck
*Assistant Examiner*—Richard M. Lorence
*Attorney, Agent, or Firm*—Charles E. Brown; Charles A. Brown

[57] ABSTRACT

A friction clutch is provided with a pressure plate arranged to reduce axial shock. According to the invention, the pressure plate has an inner part (25) and an outer annular part (26), the inner part engaging axially in the outer part and inclined tongues (40) being provided coupling the inner part to the cover (13), these tongues being disposed in internal recesses formed in the outer part and particularly in the annular support collar of this part.

5 Claims, 2 Drawing Sheets

FRICTION CLUTCH UTILIZING A PROGRESSIVE ENGAGEMENT ACTION

BACKGROUND OF THE INVENTION

1. Field of the Invention

The invention relates to a friction clutch having a progressive engagement action, and concerns more particularly such clutch in which the means of axial shock reduction which ensure this progressivity are incorporated into the pressure plate.

In a friction clutch, axial shock reduction means are provided to ensure a clutch engagement without unnecessary jolting and thereby to improve driving comfort. For certain powerful vehicles, progressivity in the clutch is a necessity. Until now, the means of axial shock reduction ensuring this progressivity of engagement have often been combined with the friction disc.

2. Description of the related art

Attempts have been made to decrease the inertia of the friction disc and consequently to simplify its structure. With this in mind, friction discs without means of axial shock reduction have been devised, these latter then being combined with other elements of the clutch assembly.

Such an arrangement is shown in U.S. Pat. No. 4,619,353 which describes a system in which the pressure plate is in two parts spaced apart axially and movable with respect to one another. It consists in fact of two plates joined to one another by small tangential tongues, one of the plates being applied against the friction disc at the moment of clutch engagement whilst the other is entrained by the means of operation. The two plate unit is joined to the cover by other small tangential tongues. Consequently, each plate is of necessity provided with radial tabs, for fixing the tongues, spaced circumferentially, which necessitates the provision of larger circumferential detachments in the periphery of the cover, weakening the latter. Moreover, the axial length of the pressure plate is increased, everything else being equal, which can constitute a serious disadvantage for the installation of the clutch in a vehicle, with a transverse engine for example.

SUMMARY OF THE INVENTION

The object of the invention is to mitigate these disadvantages by providing a new type of friction clutch in which the means of axial shock absorption ensuring the desired progressivity of action are combined with the pressure plate without it being necessary to modify the other constituent elements of the clutch, especially the cover, and without significantly increasing the axial space requirement of the clutch assembly.

Accordingly, the invention provides a friction clutch having a progressive engagement action, of the kind comprising a reaction plate to which is fixed an external annular part or cover, a friction disc and a pressure plate attached to the said cover by axially elastically deformable tongues, the said pressure plate being in two coaxial parts on one of which is supported axially-acting elastic means interposed between this part and a support zone of said cover, characterized in that said pressure plate comprises an outer annular part and an inner part partially housed in a circular opening of said outer part shaped with an annular shoulder forming an axial abutment; in that the said inner part is axially displaceable with respect to the outer part and flanked by this, in the disengaged position, such that said inner part contacts the said adjacent friction disc first; and in that the said inner part is directly attached to the said cover by elastically deformable tongues, these tongues being attached to said inner part on the side opposed to its face which interacts with the said friction disc and traversing internal recesses of said outer part.

With this arrangement, the surface of engagement of the pressure plate with the friction disc changes (increases) during the clutch engagement operation, which is favourable for a good progressivity. In fact, at the start of the operation, only the surface of the inner part of the pressure plate enters into frictional contact with the friction disc before retracting itself axially in the internal space of the outer part. This then is not applied against the friction disc until the end of the clutch engagement movement.

DESCRIPTION OF THE PREFERRED EMBODIMENTS

Figure 1:
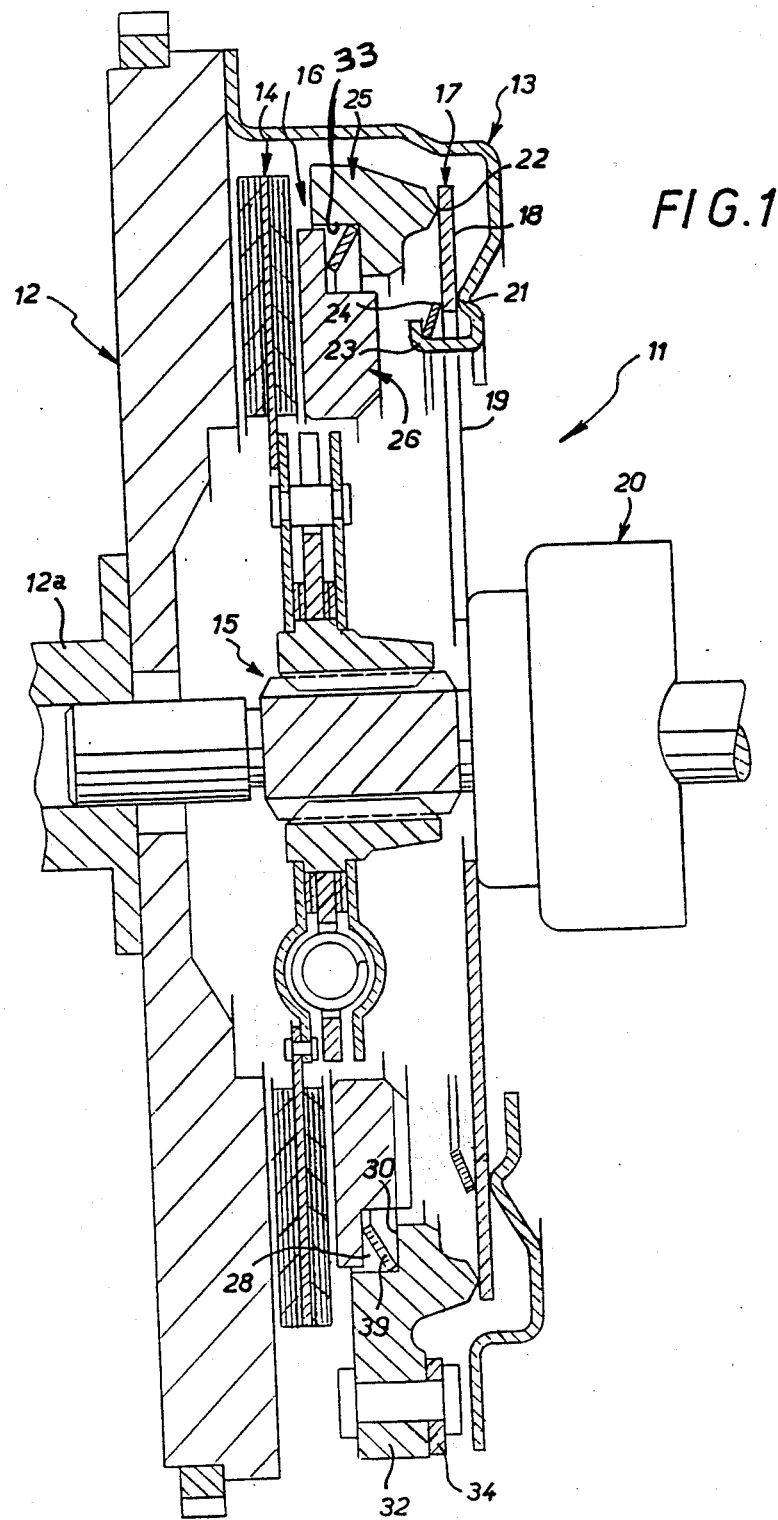
FIG. 1 is a general view in section of a clutch according to the invention.
Figure 2:
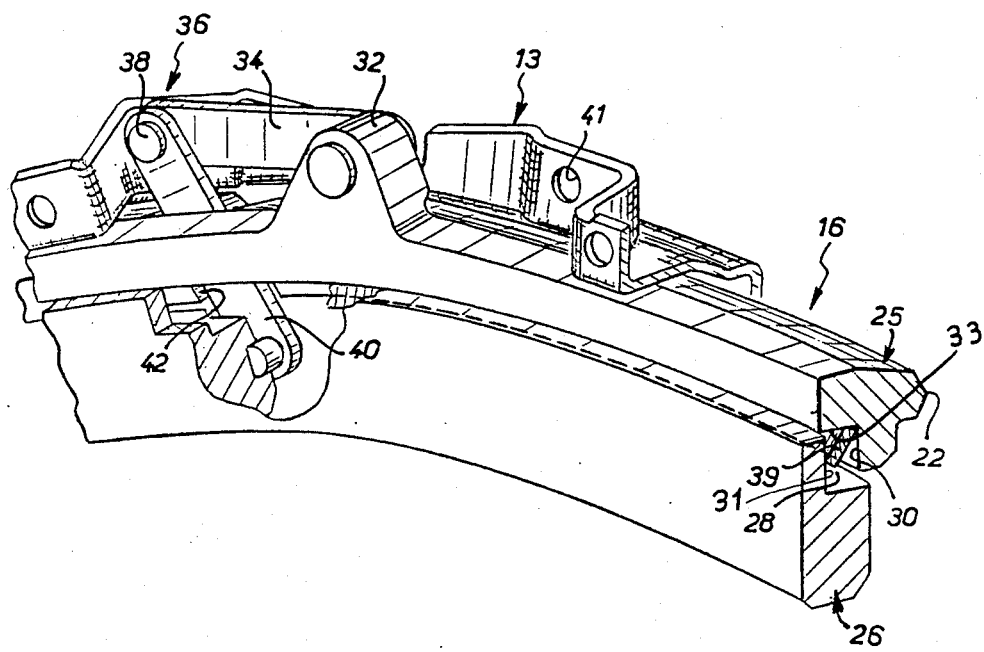
FIG. 2 is a view of details in perspective and with parts cut away, of the pressure plate joined to the cover in the clutch of FIG. 1.

In referring to the drawings and more particularly to FIGS. 1 and 2, a clutch 11 is shown in which the usual elements are, successively, a reaction plate 12, connected for rotation with a driving shaft 12a such as for example the crankshaft of an engine, a conventional annular cover part 13, a friction disc 14 connected for rotation with a driven shaft 15 disposed on the axial extension of the driving shaft, such as for example the entry shaft of a gear box and, housed in the inside of the cover and axially movable whilst being connected in rotation with it, a pressure plate 16 and a metal diaphragm 17 forming elastic axially-acting means. The latter has an outer annular part 18, in the form of a Belleville washer, prolonged towards the interior by radial fingers 19, engaged by a clutch release bearing 20 movable axially. The annular part 18 is deformed by the action of the fingers whilst being supported externally on the cover and internally on a support collar 22 formed on the opposite surface of the pressure plate 16. More precisely, the diaphragm is carried on a first support defined by an annular projection 21 of the cover, and retaining lugs 23 distributed circularly, being attached to the cover and shaped to retain a crown 24 in the form of a Belleville washer constituting a secondary support for the diaphragm, disposed obviously opposite the primary support. This arrangement fixes in a pivoting manner the diaphragm 17 to the cover 13. The friction disc 14 is axially interposed between the reaction plate 12 and the pressure plate 16. It is normally gripped between them in the engaged position of the clutch under the pushing action exercised by the diaphragm 17.

In a known way, the pressure plate is in two coaxial parts 25, 26. However, according to a more specific characteristic of the invention, these two parts are engaged, one in the other. Thus, an outer annular part 25 is distinguished from an inner part 26 partially housed in a circular opening 28 of the outer part. The outer part 25 is formed with an annular shoulder 30 forming an axial abutment for the inner part. The latter is mounted with the possibility of axial displacement with respect to the outer part, as will be seen later, and, in the declutched position, it projects axially beyond the outer part, in the direction of the friction disc, to contact it first. The outer part 25 has radial lugs 32 to which are fixed, for example by rivets 35, tangential elastically deformable tongues 34. These tongues 34 are fixed at their other ends to the cover 13, at anchorage points 36, for example by means of rivets 38 fastening in rotation the outer part 25 to the cover 13 whilst allowing an axial movement of one with respect to the other.

In addition, other elastically deformable tongues 40, inclined in relation to radial directions of the pressure plate, are fixed to the inner part 26 of the latter on the diaphragm 17 side, that is to say on the opposite side to the face of the said inner part which interacts with the friction disc 14. These tongues 40 pass through internal recesses 42 made in the said outer part 25 to be attached to the cover 13, preferably as is illustrated at the same anchorage points 36 as the tangential tongues 34 and with the same rivets 38, bolts or equivalent means. A ring 39 forming a Belleville washer, or any other element elastically deformable in the axial direction, is interposed between the said outer and inner parts 25, 26. It should be noted that the ring 39 is of the same nature as the crown 24. These two elements, with different diameters, can even be cut from the same blank. The ring 39 is supported on the shoulder 30 and bears on a shoulder 31 of the inner part 25, the shoulders 30 and 31 being opposite.

How the operation proceeds will be clear from the following description. The inclined tongues 40 are shaped so that, whilst the clutch is in the disengaged position, the inner part 26 projects slightly beyond the outer part 25 towards the friction disc, without touching it. The ring 39 can also help to determine the position of the inner part in relation to the outer part, in the declutched position. During operation of the clutch, the inner part 26 then begins to make frictional contact with the friction disc and, at the same time, engages more deeply in the interior of the outer part whilst deforming the sloping tongues 40 and compressing the ring forming the Belleville washer 39. The totality of the axial reactions produced during the relative displacement of the said inner and outer parts supplies the desired progressivity of clutch engagement. Towards the end of the progress of clutch engagement, the annular surface of the part on the outside with respect to the friction disc re-enters into contact with it. The rubbing surface of the inner part 26 is greater than that of the outer part 27.

Figure 3:
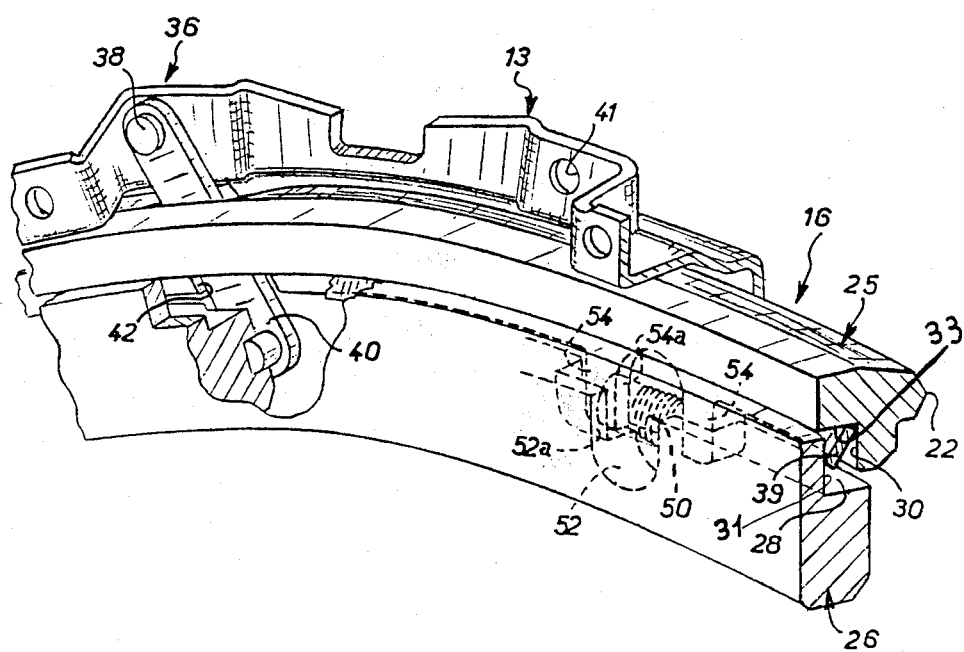
FIG. 3 is an analogous view to FIG. 2 showing a variant.

In the variant in FIG. 3, springs 50 to suppress vibrations are disposed in housings arranged opposite one another, essentially circumferentially in the said inner and outer parts. More precisely, housings 52 with lateral abutments 52a, are made in the inner part 26 whilst pairs of radial projections 54, defining lateral abutments 54a project from the outer part 25. Each helicoidal spring 50 is inserted with an initial tension, between the abutments 52a and 54a. In this way it is possible to replace the springs with low stiffness usually housed in the friction disc, which frees space in the structure of the friction disc and reduces its inertia, without in any way increasing the axial space requirement of the pressure plate. These springs can act at a greater radius which increases their suppressing activity because they are found in a zone further away from the common axis of the two shafts. Furthermore, the two outer and inner parts being secured in rotation by the mounting of the springs, the usual tangential tongues (reference 34 in FIGS. 1 and 2) can be eliminated as well as the corresponding fixing lugs 32.

The present invention is not limited to the embodiments described. For example, the diaphragm can be replaced by helicoidal springs. In FIG. 2, if the projection which the cover has for fixing the tongues 34 is symmetric, the tongues 34 can be fixed to the cover 13 by riveting, by way of hole 41, or left free in the way of those which work by buckling. In the same way, the tongues 40 can be fixed to 41 whilst placing them completely radially or slightly inclined in the other direction. Fixing of the tongues 40 to the inner part 26 by riveting by means of a blind hole, can also be made by riveting by means of a through hole. The relationship of the surfaces between the parts 25 and 26 can vary.

It is to be noted that in FIG. 3 the edges of the ring 39 are rounded and that it is centred by the axial edge 33 delimiting the opening 28 of the outer part 25. A slight gap exists between the cut of the shoulder 31 and the axial edge 33.

Finally, it can be seen that the ring 39 is here disposed radially beyond crown 24.

What is claimed is:

1. A friction clutch having a progressive engagement action of the kind comprising a reaction plate to which is fixed an external annular cover part, a friction disc, and a pressure plate attached to said cover by axially elastically deformable tongues, said pressure plate being in two coaxial parts on one of which is supported axially-acting elastic means interposed between said one part and a support zone of said cover, wherein said pressure plate comprises an outer annular part and an inner part partially housed in a circular opening of said outer part defined by an annular shoulder forming an axial abutment, and said inner part is mounted for axial displacement with respect to the outer part and is operable to engage said adjacent friction disc before the outer part, and whereby said inner part is directly attached to said cover by said elastically deformable tongues, said tongues being attached to said inner part on the side opposed to its face which interacts with said friction disc and extending through internal precesses formed in said outer part, said axially-acting elastic means acting on said outer part of said pressure plate, and said tongues being fixed to the outer periphery of said cover.

2. A friction clutch as claimed in claim 1, wherein said outer part is attached to the cover by second elastically deformable tongues which extend essentially tangentially between said outer part and cover, said tongues and said second tongues being fixed two by two to a common corresponding anchorage point on said cover.

3. A friction clutch as claimed in claim 1, wherein springs for suppressing vibrations are disposed in housings facing each other essentially circumferentially in said outer and inner parts.

4. A friction clutch as claimed in claim 1, wherein the first said tongues are inclined with respect to the radial direction of said pressure plate.

5. A friction clutch as claimed in claim 1, wherein a ring forming a Belleville washer or other elastically deformable element is interposed between the outer and inner parts.

* * * * *